United States Patent [19]

Beasley

[11] 3,741,704
[45] June 26, 1973

[54] APPARATUS FOR HOT RUNNER INJECTION MOULDING

[75] Inventor: Maurice Trevor Beasley, Nuneaton, England

[73] Assignee: Joseph Lucas (Industries) Limited, Birmingham, England

[22] Filed: Dec. 10, 1970

[21] Appl. No.: 96,953

[30] Foreign Application Priority Data
Dec. 11, 1969 Great Britain.................. 60,502/69

[52] U.S. Cl. .............................................. 425/245
[51] Int. Cl............................................... B29f 1/03
[58] Field of Search.................. 18/30 WD, 30 WM, 18/30 NM, 30 NA, 30 NB, 30 NZ, 30 RM, 30 RH, 30 RV, 30 NW, 30 NS, 30 NH, 30 AP; 164/303, 312, 314, 316; 425/242, 247, 245

[56] References Cited
UNITED STATES PATENTS

| | | | |
|---|---|---|---|
| 3,356,131 | 12/1967 | Smith | 164/314 |
| 2,928,125 | 3/1960 | Smucker et al. | 18/30 NB |
| 2,834,992 | 5/1958 | Jupa | 18/30 RH |
| 2,668,325 | 2/1954 | Goodwin | 18/30 NS |
| 2,891,282 | 6/1959 | Neitlich | 18/30 WD |
| 2,865,050 | 12/1958 | Strauss | 18/30 RV |
| 3,504,733 | 4/1970 | Smith | 425/247 X |

FOREIGN PATENTS OR APPLICATIONS

| | | | |
|---|---|---|---|
| 1,918,075 | 10/1969 | Germany | 18/30 WD |
| 658,976 | 3/1963 | Canada | 18/30 RH |

Primary Examiner—J. Spencer Overholser
Assistant Examiner—David S. Safran
Attorney—Holman & Stern

[57] ABSTRACT

Apparatus for hot runner injection moulding includes a plunger reciprocable in a bore to inject molten synthetic resin material from a nozzle portion of the bore in a die cavity difining the shape of the article to be produced. Further the apparatus includes means thermally insulating the nozzle portion of the bore from the die when the apparatus is in use with the nozzle portion in position adjacent the die cavity.

4 Claims, 4 Drawing Figures

PATENTED JUN 26 1973 3,741,704
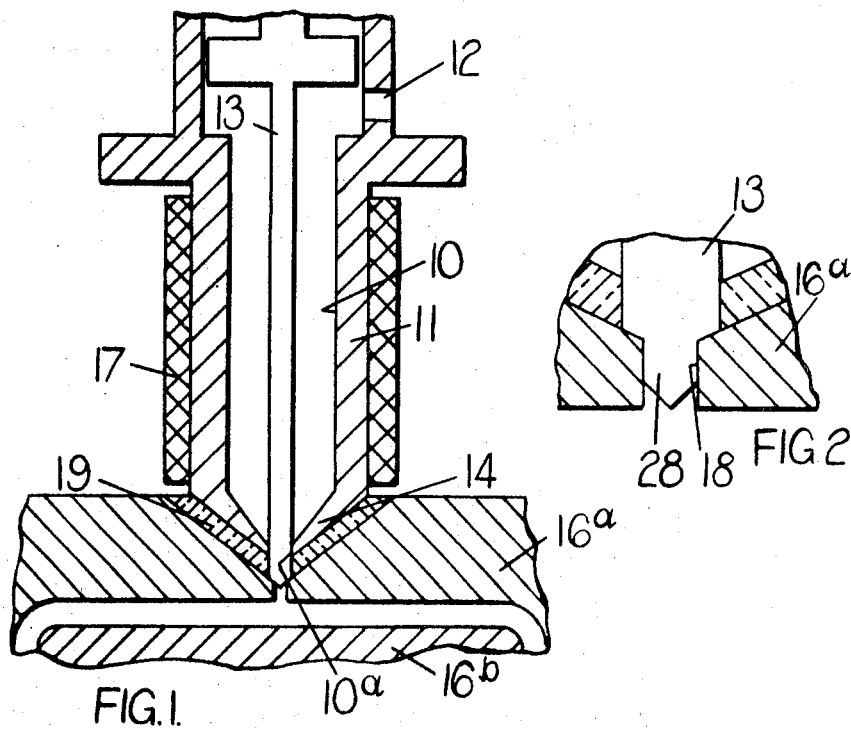
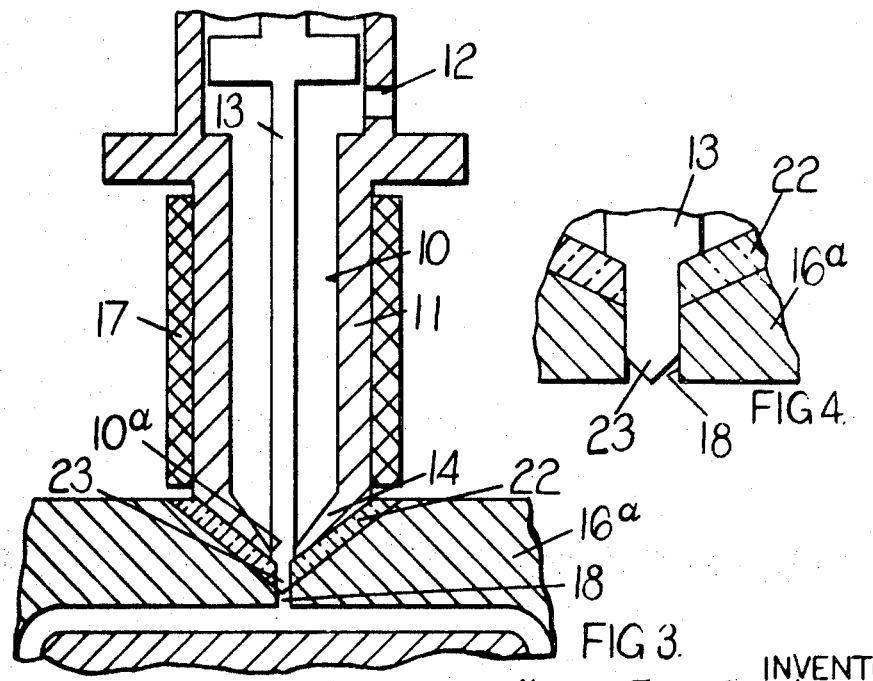
INVENTOR
Maurice Trevon Beasley
Holman & Stern
ATTORNEYS

APPARATUS FOR HOT RUNNER INJECTION MOULDING

This invention relates to apparatus for hot runner injection moulding, the apparatus being of the type including a plunger reciprocable in a bore to inject molten synthetic resin material from a nozzle portion of said bore into a die cavity defining the shape of the article to be produced.

Apparatus of the type specified, according to the invention, includes means thermally insulating said nozzle portion of the bore from the die when the apparatus is in use with said nozzle portion in position adjacent the die cavity.

In the accompanying drawings,

FIG. 1 is a sectional view of apparatus according to one example of the invention, FIG. 2 is a sectional view of part of a modified form of the apparatus shown in FIG. 1, FIG. 3 is a sectional view of apparatus according to a second example of the invention and FIG. 4 is a sectional view of part of a modified form of the apparatus shown in FIG. 3.

Referring to FIG. 1, apparatus for hot runner injection moulding comprises a metal tube 11 formed with a stepped cylindrical bore 10 and having at one end thereof an inlet passage 12 through which molten synthetic resin material can flow from a feeding mechanism (not shown). Mounted within the tube 11 for axial movement therein is a plunger 13. The plunger 13 is reciprocable within the tube 11 and is urged in the direction of resin flow by spring means (not shown). Molten resin is fed via the inlet 12 into the tube 11 until the pressure of the resin overcomes the spring pressure acting on the plunger 13 whereby the plunger is lifted to open a nozzle portion 14 and inject resin into a cavity 15 defined between fixed and movable die parts 16a, 16b, the cavity defining the shape of the article to be produced. A heater 17 controlled by a thermocouple (not shown) in contact with the heater and the tube 11, is mounted round the tube 11 below the inlet passage 12 and serves to prevent solidification of the molten resin as it passes down the tube 11. The die part 16a, is formed with an inlet port 18 through which molten resin can flow into the die cavity 15. Also the die part 16a, adjacent the inlet port 18 is formed with a recess complementary with the nozzle portion 14 of the tube so that in use the nozzle portion 14 is engaged in the recess and a narrow portion 10a of the bore 10 in the nozzle communicates with the inlet port 18 in the die part 16 a. The nozzle portion 14 of the tube 11 is thermally insulated from the die part 16a by a frusto-conical sleeve 19 positioned between the nozzle portion 14 and the die part 16a, the sleeve 19 preferably being formed from a pressed asbestos material. The provision of this frusto-conical insulating sleeve 19 serves to prevent the formation of a blockage of solidified resin material in the nozzle as a result of the cooling down of the nozzle and hence the molten resin therein, by conduction of heat into the die part. As shown in FIG. 1 the sleeve 19 extends the full length of the nozzle portion 14 and at its end adjacent the inlet part 18 defines an extension of the narrow portion 10a of the bore in the tube 11, the plunger 13 normally extending through the nozzle portion 14 to close the aperture in the sleeve 19. The sleeve 19 provides sufficient insulation to allow injection moulding without the formation of blockages in the nozzle portion 14 for certain synthetic resin materials such as, for example, acrylonitrile - butadiene - styrene (ABS) and polypropylene.

In a modification, as shown in FIG. 2, the plunger 13 is formed with a portion 28 of reduced diameter which normally extends from the nozzle portion 14 and the insulating sleeve 19 into the inlet part 18, the conduction of heat through the narrow portion 28 into the die part 16 being sufficiently small so as not to cause solidification of the molten resin material.

Referring to FIG. 3, in a second example of the invention, the nozzle portion 14 of the tube 11 is thermally insulated from the die part 16a by a frusto-conical sleeve 22, again preferably formed of a pressed asbestos material. However, as can be seen from the diagram the frusto-conical sleeve 22 extends from the one end of the nozzle portion 14 adjacent the tube 11 to protrude from the other end of the nozzle portion 14, defining the narrow portion 10a of the bore 10, to define an extension of the inlet port 18. The plunger 13 is formed with a portion 23 of reduced diameter in this region, the portion 23 normally extending from the nozzle portion 14 to close the aperture in the sleeve 22. The frusto-conical sleeve 22 provides more efficient insulation than the frusto-conical sleeve 19 described in the example above and is used with the injection moulding apparatus of the type specified when the synthetic resin materials show greater tendency to form blockages in the nozzle portion 14. Examples of synthetic resin material suitable for use with apparatus according to this modification of the invention are low viscosity materials having a narrow freezing range such as polyamides and materials having a high melt viscosity such as acrylics.

In a modification of the second example of the invention, as shown in FIG. 4, the portion 23 of the plunger of reduced diameter extends from the insulating sleeve 22 into the inlet port 18, the conduction of heat through the portion 23 of the plunger into the die part 16a being sufficiently small so as not to cause solidification of the molten synthetic resin material.

Having thus described my invention what I claim as new and desire to secure by Letter Patent is:

1. Apparatus for hot runner injection moulding including a die assembly, a die cavity defined within said die assembly, an inlet port in said die assembly communicating with said die cavity, molten synthetic resin material being injected, in use, through said inlet port into said die cavity, an injector device for delivering molten synthetic resin material to said die cavity through said inlet port, said injector device including an injection nozzle having an open end communicating with said inlet port and an elongated plunger means disposed in said bore in said injector device, said plunger being reciprocably mounted in said bore for movement between an inoperative position wherein one end of said plunger means extends into and closes the open end of said injection nozzle to prevent flow of the molten synthetic resin through said injection nozzle into said inlet port and an operative position wherein said one end of said plunger means is withdrawn from said injection nozzle and said plunger allows molten synthetic resin material to flow through said injection nozzle into said inlet port, and a thermally insulating sleeve positioned around said injection nozzle and having a corresponding hole therethrough so as to provide thermally insulating material between said die assembly and the whole of that portion of said injection nozzle adjacent thereto, said hole in said sleeve communicating with said inlet port so that said sleeve is spaced from said die cavity by a portion of said die assembly and so that when said plunger means is in said operative position, the molten synthetic resin material can flow from said injection nozzle through said hole in said sleeve and through said inlet port to said die cavity, and when said plunger means is in said inoperative position said one end of said plunger means further extending through said injection nozzle and said hole in said sleeve into said inlet port.

2. Apparatus as claimed in claim 1 wherein said thermally insulating sleeve is frusto-conical and is formed of pressed asbestos.

3. Apparatus as claimed in claim 1 wherein when said plunger means is in said inoperative position said plunger extends through said injection nozzle to close said hole in said sleeve as well as said open end of said injection nozzle.

4. Apparatus as claimed in claim 1 and further including a heater means surrounding said injector means for heating said molten synthetic resin material to prevent solidification thereof in said bore in said injector means.

* * * * *